(12) United States Patent
Shen et al.

(10) Patent No.: US 9,021,564 B2
(45) Date of Patent: Apr. 28, 2015

(54) METHOD AND APPARATUS TO ASSIST USER INPUT BASED ON A MOBILE TERMINAL BROWSER

(71) Applicant: Tencent Technology (Shenzhen) Company Limited, Shenzhen (CN)

(72) Inventors: Jinlong Shen, Shenzhen (CN); Yanliang Liu, Shenzhen (CN); Bo Hu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 7 days.

(21) Appl. No.: 13/941,499

(22) Filed: Jul. 14, 2013

(65) Prior Publication Data

US 2013/0305327 A1  Nov. 14, 2013

Related U.S. Application Data

(63) Continuation of application No. PCT/CN2011/084128, filed on Dec. 16, 2011.

(30) Foreign Application Priority Data

Jan. 17, 2011 (CN) .......................... 2011 1 0021262

(51) Int. Cl.
*H04L 29/06* (2006.01)
*G06F 21/41* (2013.01)
(52) U.S. Cl.
CPC .............. *H04L 63/08* (2013.01); *H04L 63/083* (2013.01); *G06F 21/41* (2013.01)

(58) Field of Classification Search
None
See application file for complete search history.

(56) References Cited

U.S. PATENT DOCUMENTS

| 2005/0177731 A1* | 8/2005 | Torres et al. .................. 713/182 |
| 2005/0257134 A1* | 11/2005 | Goodman et al. ............ 715/507 |
| 2006/0179404 A1* | 8/2006 | Yolleck et al. ................ 715/507 |
| 2009/0328169 A1* | 12/2009 | Hutchison et al. ................ 726/7 |
| 2010/0017616 A1* | 1/2010 | Nichols et al. ................ 713/183 |

* cited by examiner

*Primary Examiner* — David Pearson
(74) *Attorney, Agent, or Firm* — Anova Law Group, PLLC (57) ABSTRACT

The present invention discloses a method and apparatus for assisting user input based on the mobile terminal browser, including: storing login authentication information entered by a user when the user logs in a website for a first time from a mobile terminal; after determining that a current page in the mobile terminal browser is a login page and the user logs in after the first time, loading the stored authentication login information to the current login page; receiving the login authentication trigger information; encapsulating the loaded login authentication information of the current login page; and generating a login request for login authentication by a website corresponding to the current login page. By using the disclosed method and apparatus, the number of times the user is required to enter the username and password can be reduced, and the amount of time for the user to access Internet websites can be reduced.

12 Claims, 4 Drawing Sheets

METHOD AND APPARATUS TO ASSIST USER INPUT BASED ON A MOBILE TERMINAL BROWSER

CROSS-REFERENCES TO RELATED APPLICATIONS

This application is a continuation application of PCT patent application no. PCT/CN2011/084128, filed on Dec. 16, 2011, which claims the priority of Chinese patent application No. 201110021262.2, filed on Jan. 17, 2011, the entire contents of all of which are incorporated herein by reference.

TECHNICAL FIELD

The present invention relates to the computer network technology and, more particularly, to the method and apparatus to assist user input based on a mobile terminal browser.

BACKGROUND

With the development of mobile communication technology, more and more users can connect to the Internet from a mobile terminal. Through the Internet, they may search for information, communicate with friends and colleagues any time and any where, or enjoy some personalized leisure and entertainment. The Internet access through a mobile terminal has the characteristics of convenience, quickness, and accessibility at anytime and anywhere. The user can conveniently connect to the Internet as long as the user is within an area covered by the mobile phone network.

In order to protect the legitimate rights and interests of end users, when a user connects to the Internet or those websites providing personalized services through the mobile terminal, the user is required to enter the registered username and password information through the mobile terminal browser. Only after the corresponding network server authenticates and passes the access, the user is allowed to connect to the Internet through the mobile terminal.

Because the size of the existing mobile terminal is usually small, the keyboard space is limited for the user to enter the username and password, as most mobile terminals use a 12-key keyboard. But the username and password often contain letters, numbers, and symbols, as a result, a user needs to make multiple switches among the letters, numbers, and symbols to complete one input operation for the username and password. Thus, the operation is very inconvenient.

In particular, for most of current websites, in order for a user to get personalized services, the user is required to log in a website first before the user can start using the services provided by the website. Thus, the user needs to enter the username and password every time the user tries to access this website. This operation is undoubtedly a tedious process for the user. Further, connecting to the Internet through a mobile terminal has the characteristics of high frequency and short duration. Therefore, the user may be frequently required to enter the username and password multiple times a day, which is very inconvenient.

To effectively reduce the number of times that a user needs to enter the username and password when the user connects to the Internet through the mobile terminal browser, to avoid high frequency operation, and to reduce the amount of time to gain access to the Internet, existing technologies introduced a method to assist user input based on the mobile terminal using a small piece of data (Cookie).

That is, when the user registers and uses the website for the first time, the Internet website records the user login information, such as the username, ID (identification), password, visited web pages, and visit duration, etc., and saves the information in a Cookie (a small data file) in the mobile terminal browser.

When the user needs to re-enter the login page of the Internet website through the mobile terminal browser, the Internet website can obtain the user's login information by reading from the pre-stored Cookie, and verify the authentication of the uploaded information. If login information uploaded from the Cookie is verified to be authenticated, the username and password is not required, and the user can directly enter the login status. That is, the user can directly enter the browsing page of the Internet website without going through the login page.

Thus, using Cookie to store the user's login information and to assist user input can greatly alleviate the problem that a user needs to repeatedly enter the login username and password on a PC. However, in the wireless network, first, the pre-stored user information, i.e. Cookie, has to be transmitted through some intermediate equipment, such as switches and gateways etc., before it reaches the Internet website. Because of the characteristics of the wireless network, the transmitted Cookie may be filtered by intermediate devices and, as a result, the Cookie cannot reach the designated Internet website, and results in Cookie authentication failure. Therefore, the user still needs to enter the username and password through the mobile terminal browser to log in again, leading to longer user login time.

Second, due to the security restrictions, each Internet website can only be compatible with the Cookie issued by itself. That is, the information in the Cookie is valid only when the Cookie is used in the same domain. For example, the Cookie information set by Internet website A is only valid on Internet website A, and can not be used in Internet website B. For different Internet websites, even if the username and password are the same, the information in the Cookie cannot be shared. Different Internet websites need separate logins. Even if most users use the same username and password in the Internet websites, they need to perform the login operation repeatedly when they log in websites for the first time. Thus, the login process is still quite tedious, and it takes more storage space when more Internet websites are visited, because each Internet website stores the information to its own Cookie corresponding to the website.

In addition, the usage of Cookie information needs to be supported by the Internet websites. If an Internet website does not support the Cookie mechanism, the mobile terminal browser cannot assist to reduce the repeated input operations by the user.

CONTENTS OF THE INVENTION

Therefore, an objective of the present invention is to provide a method to assist the user input based on a mobile terminal browser, and to reduce the number of times that a user is required to enter the username and password when the user tries to connect to Internet websites, and to decrease the amount of time for the user to gain access to Internet websites.

Another objective of the present invention is to provide an apparatus to assist user input based on a mobile terminal browser, to reduce the number of times that a user is required to enter the username and password when the tries to connect to Internet websites, and to decrease the amount of time for the user to gain access to Internet websites.

In order to achieve the above objectives, the technical solutions of the present invention include:

A method for assisting user input based on a mobile terminal browser, the method includes storing login authentication information entered by a user when the user logs in a website for a first time from a mobile terminal; after determining that a current page in the mobile terminal browser is a login page and the user logs in after the first time, loading the stored authentication login information to the current login page; receiving the login authentication trigger information; encapsulating the loaded login authentication information of the current login page; and generating a login request for login authentication by a website corresponding to the current login page.

An apparatus for assisting user input based on a mobile terminal browser. The apparatus includes a login authentication information storage module; a login page processing module; and a login request generation module. The login authentication information storage module is configured to store login authentication information entered by a user when the user logs in a website for a first time. The login page processing module is configured to determine a current page in the mobile terminal browser is a login page and the user logs in after the first time, and to load the authentication login information stored in the login authentication information storage module into the current login page. The login request generation module is configured to receive login authentication trigger information from user input, to encapsulate the login authentication information in the current login page, to generate a login request, and to send the login request to a website corresponding to the current login page.

By using the disclosed methods for assisting user input based on the mobile terminal browser, the login authentication information entered by the user when a user logs in an Internet website for the first time is stored; the current page in the mobile terminal browser is determined as a login page, and the user logs in again; the pre-stored login authentication information is loaded into the current login page; the login authentication information in the current login page is encapsulated to generate a login request.

Thus, by using the mobile terminal to store the login authentication information for the user login, rather than by using the Internet website to create a Cookie containing the username and password information and issue to the mobile terminal, the login authentication information does not bind to a particular Internet website. The login authentication information stored in the mobile terminal can have more generality, and is suitable for the user to log in to different Internet websites.

BRIEF DESCRIPTION OF DRAWINGS

The exemplary embodiments of the present invention are described in detail by referring to the accompanying drawings, such that those skilled in the art can understand the features and advantages of the present invention. In the accompanying drawings.

EMBODIMENTS

Current method using the Cookie to record the login status information to assist user input has many defects, such as the Cookie being filtered by an intermediate device, Cookie not being accepted by an Internet website because each Internet website only compatible with the Cookies issued by itself, and the Cookie mechanism needing to be supported by Internet websites, etc. Thus, the user is still required to enter the username and password a lot of times, leading to longer user login time.

In real practice, most users usually access the Internet through a mobile terminal in short fragmented time periods, for example, accessing the Internet while waiting for the bus, subway. Therefore, for a user accessing Internet through a mobile terminal, it is very important to be able to reduce the difficulty of each login operation, and improve the user experience.

In the disclosed embodiments of the present invention, it may be assumed that a user generally uses the same username and password when the user access different Internet websites providing personalized services. Therefore, when the user logs in any Internet website for the first time, the mobile terminal stores the username and password information entered by the user. When the user tries to log in an Internet website again, the website can be the same or different from the website the user first logged in, the pre-stored username and password information is read into the corresponding login page, and the information is encapsulated and sent to the Internet website for the login authentication.

In this way, by using the mobile terminal to store the username and password information for user login, while not using the Internet website to record the Cookie containing the username and password information and issue to the mobile terminal, the mobile terminal stored username and password information is more generic and is suitable for logging in different Internet websites.

Figure 4:
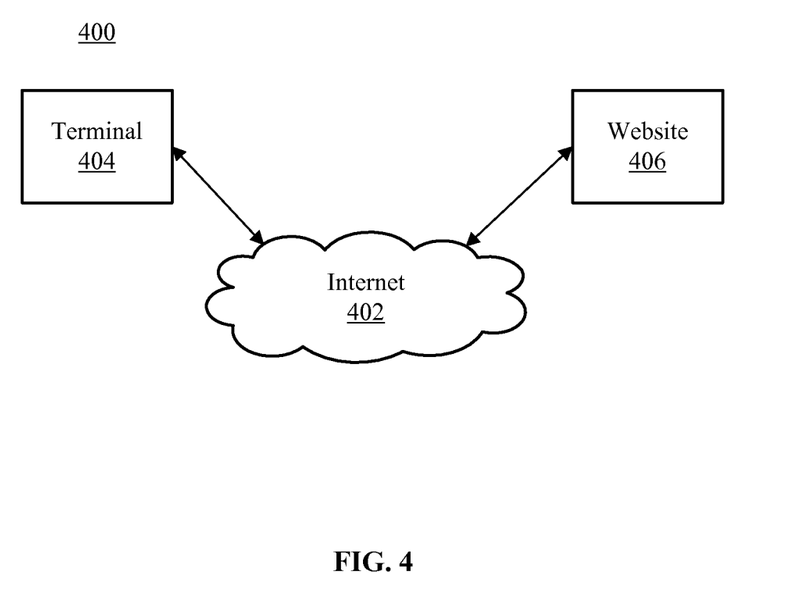
FIG. 4 shows an environment incorporating certain aspects of the present invention.

FIG. 4 illustrates an exemplary environment 400 incorporating certain disclosed embodiments. As shown in FIG. 4, environment 400 may include a terminal 404, a website 406, and the Internet 402. The terminal 404 may access the website 406 through the Internet 402 for certain personalized services provided by the website 406. Although only one website 406 and one terminal 404 are shown in the environment 400, any number of terminals 406 or websites 404 may be included, and other devices may also be included.

The Internet 402 may include any appropriate type of communication network for providing network connections to the terminal 404 and website 406 or among multiple terminals 404 and websites 406. For example, Internet 402 may include the Internet or other types of computer networks or telecommunication networks, either wired or wireless.

A terminal, as used herein, may refer to any appropriate user terminal with certain computing capabilities, such as a personal computer (PC), a work station computer, a server computer, a hand-held computing device (tablet), a smart phone or mobile phone, or any other user-side computing device. In certain embodiments, terminal 404 may be a wireless terminal, such as a smart phone, a tablet computer, or a mobile phone, etc.

A website, as used herein, may refer one or more server computers configured to provide certain web server functionalities to provide certain personalized services, which may require any user accessing the services to authenticate to the website before the access. A web server may also include one or more processors to execute computer programs in parallel.

Figure 5:
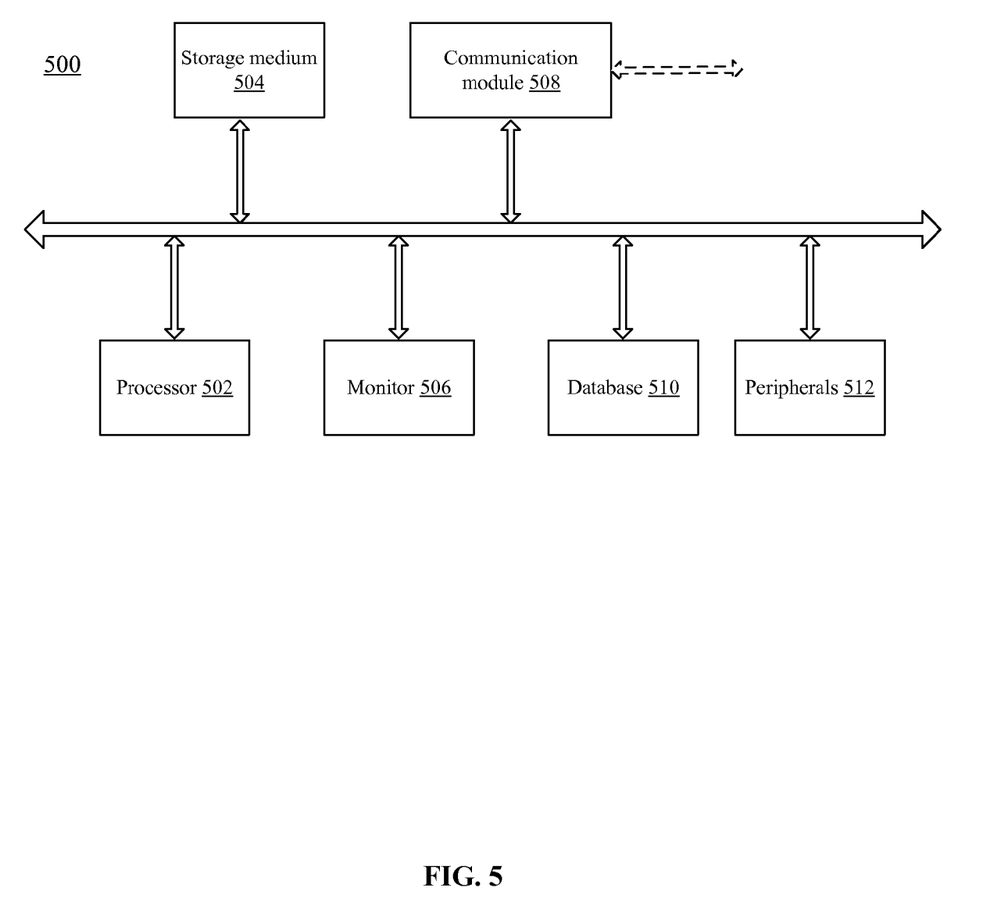
FIG. 5 shows a block diagram of an exemplary computing system according to the disclosed embodiments.

Terminal 404 may be implemented on any appropriate computing platform. FIG. 5 shows a block diagram of an exemplary computer system 500 capable of implementing terminal 404.

As shown in FIG. 5, computer system 500 may include a processor 502, a storage medium 504, a monitor 506, a communication module 508, a database 510, and peripherals 512. Certain devices may be omitted and other devices may be included.

Processor 502 may include any appropriate processor or processors. Further, processor 502 can include multiple cores for multi-thread or parallel processing. Storage medium 504 may include memory modules, such as ROM, RAM, flash memory modules, and erasable and rewritable memory, and mass storages, such as CD-ROM, U-disk, and hard disk, etc. Storage medium 504 may store computer programs for implementing various processes, when executed by processor 502.

Further, peripherals 512 may include I/O devices such as keyboard and mouse, and communication module 508 may include network devices for establishing connections through the communication network 902. Database 510 may include one or more databases for storing certain data and for performing certain operations on the stored data, such as database searching.

Figure 1:
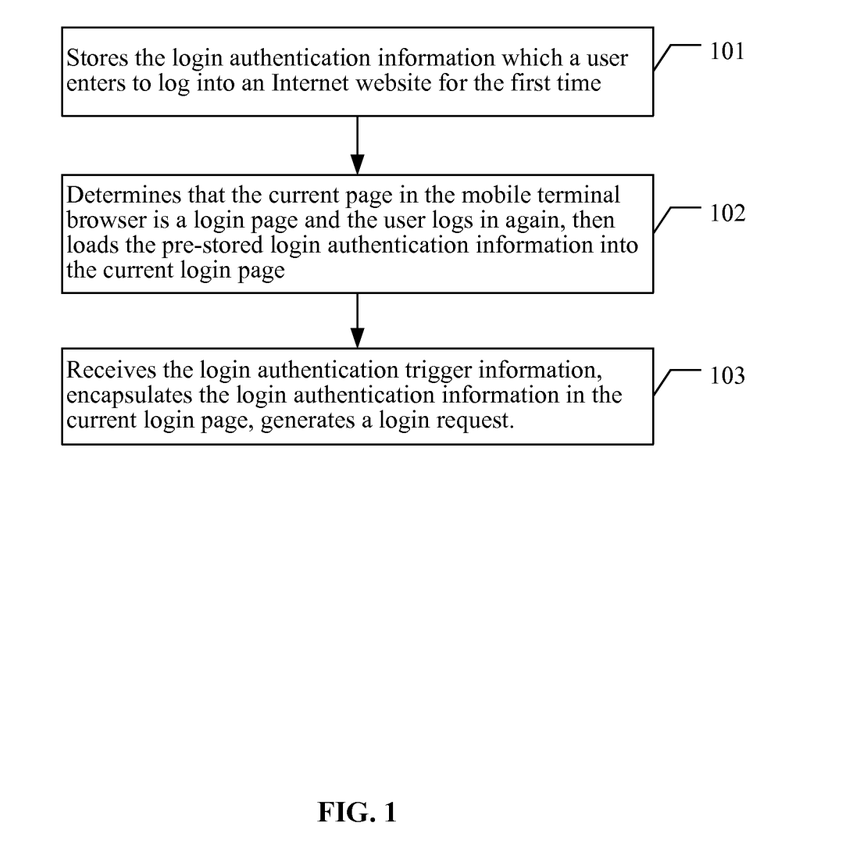
FIG. 1 shows the flow chart of an exemplary process for assisting user input based on a mobile terminal browser according to the disclosed embodiments.

In operation, terminal 404 may run a web browser and perform certain Internet accessing for personalized services. FIG. 1 shows the flow chart of an exemplary process for assisting user input based on a mobile terminal browser. As shown in FIG. 1, the process includes the followings:

Step 101, storing the login authentication information entered by the user when the user logs in an Internet website for the first time. The first time login operation may include any appropriate operation for the user to log in the website for the first time.

The mobile terminal checks whether the user logs in for the first time by querying or searching the pre-stored history records. If the history records do not contain any corresponding information which indicates the user is required to login and has been authenticated by an Internet website, it can be determined that the user logs in for the first time. Of course, in one embodiment, a pre-allocated file used to store the login authentication information can also be queried. If the file does not contain the login authentication information, it can be determined that the user logs in for the first time.

After determining that the user logs in for the first time, the user login authentication information entered by the user through the keyboard of the mobile terminal is stored into the pre-allocated file used for storing the login authentication information. Other storage medium may also be used. The login authentication information can be the username and password information, the user account and password information, or other kinds of authentication information.

Step 102, after determining that a current page in the mobile terminal browser is a login page and the user logs in again, reading the pre-stored login authentication information into the current login page.

Determining whether the user logs in again is to verify the user doesn't log in for the first time described in Step 101. Logging in again includes logging in the Internet website which has been logged in for the first time, or logging in any other internet website except the first time logged-in website.

That is, instead of letting the Internet website determine whether the current page is a login page of the Internet website, the mobile terminal determines whether the current page opened by the user in the mobile terminal browser is the login page of the Internet website. If the current page is not a login page, the process may be complete. Of course, in practical applications, the Internet website can check whether the current page opened through the mobile terminal browser is a login page of the Internet website, and informs the mobile terminal about this information.

Different Internet websites may have different login pages and different input controls. However, the login page information of Internet websites frequently accessed by the user can be collected, and the collected information can be statistically analyzed to extract the common statistical characteristics of the login pages from various Internet websites. Such information may then be used to determine whether the current web page is the login page of the Internet website.

For example, a login page of each Internet website may often contain a 2×2 field (table) or a 3×2 field authentication area. The 2×2 field authentication area includes a username (or user account) sub-region and a password sub-region, and the username sub-region includes a username and the username information to be entered. Further, the authentication area may also include verification code sub-region.

Thus, the common statistical characteristics extracted from the login pages of Internet websites include: the characteristics of the username information, the characteristics of password information and the characteristics of verification code. It can be determined that the current page is a login page if the current web page in the mobile terminal browser contains all or any of the common statistical characteristics information.

In practical applications, when it is determined that the current page in the mobile terminal browser is a login page and the user logs in again, a message can be further prompted to ask the user whether the user wants to use the pre-stored login authentication information. If 'Yes' is chosen, the pre-stored login authentication information is loaded into the current login page. If the user chooses 'No', the user enters the corresponding login authentication information through the keyboard on the mobile terminal.

If there are two or more records of the pre-stored login authentication information, the login authentication information records can be displayed in parallel for the user to choose, and the login authentication information is read into the current login page according to the user's choice.

Further, when the user tries to log in a different Internet website, the user may have set a different username and password. After the pre-stored login authentication information is read into the current login page, the user can modify the login authentication information shown on the current login page. If the user modifies the login authentication information and then clicks the login control, the mobile terminal saves the login authentication information modified by the user.

When the login authentication information modified by the user is ready to be stored, if the pre-stored login authentication information exactly matches the modified or updated user login authentication information, nothing will be done. Otherwise, the revised or updated user login authentication is saved. Of course, in actual applications, when the user login authentication information is modified by the user, if the username or user account is the same as the pre-stored username or the user account, but the password is different, then only the stored password is overwritten with the modified password.

Preferably, the user can also perform updating operations on the stored login authentication information, such as, modifying, deleting, and adding login authentication information.

Step 103, receiving the login authentication trigger information, encapsulating the login authentication information in the current login page, and generating a login request. Specifically, when the user clicks the login control on the login page, the page outputs the login authentication trigger information indicating that the user confirms the login authentication information in the current login page. The mobile terminal browser encapsulates the login authentication information in the current login page into a login request, and sends the login request to the Internet website for login authentication.

Figure 2:
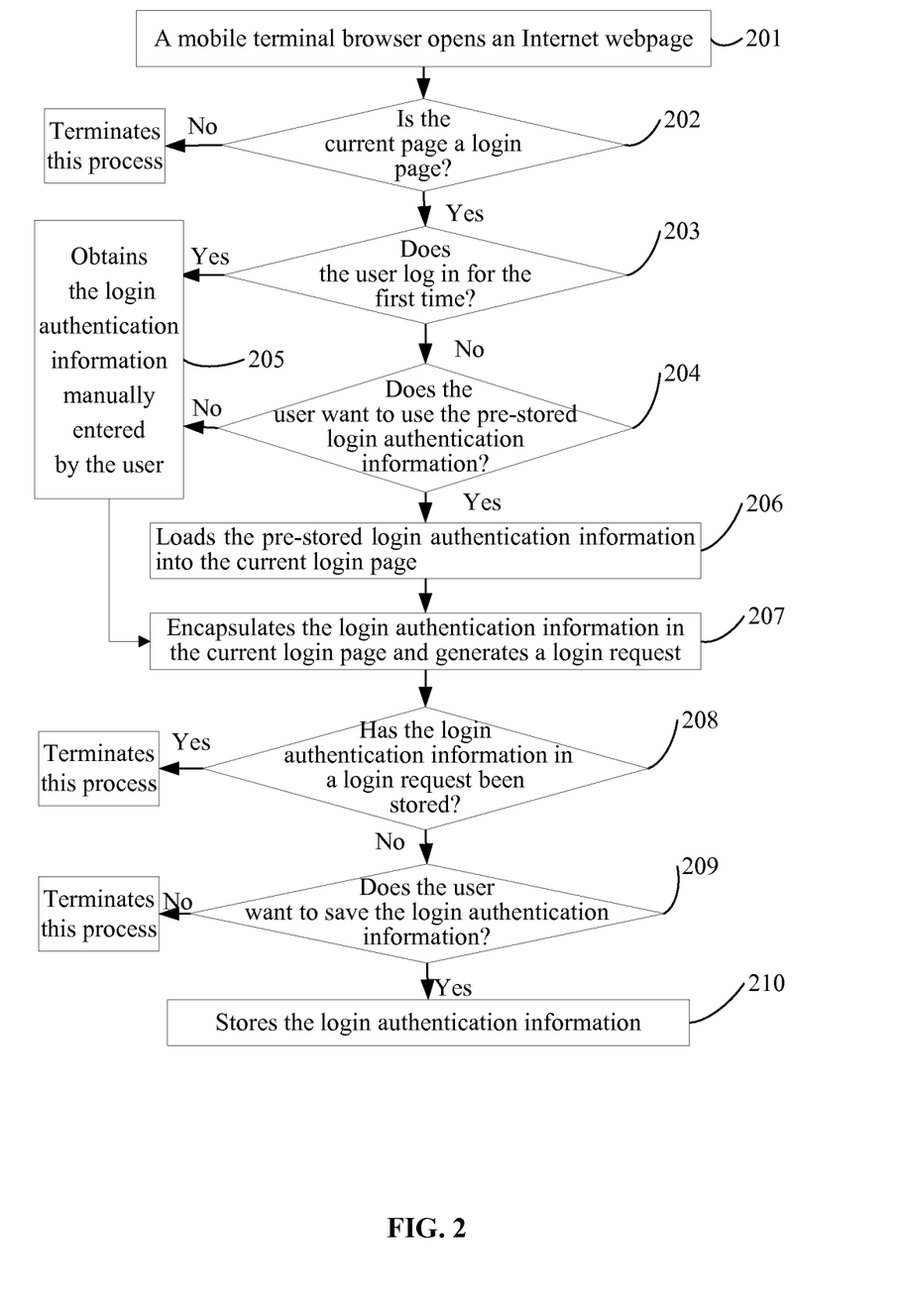
FIG. 2 shows a detailed flow chart of an exemplary process for assisting user input based on a mobile terminal browser according to the disclosed embodiments.

FIG. 2 shows a detail flow chart of an exemplary process for assisting user input based on a mobile terminal browser. As shown in FIG. 2, the process includes:

Step 201, a mobile terminal browser opens a page of an Internet website. For example, the mobile terminal browser opens the home page of a game site, selects the desired game, and clicks to enter the login page.

Step 202, it is determined whether the current page is a login page. When it is determined that the current page is a login page, Step 203 is executed. When it is determined that the current page is not a login page, the process may complete.

The mobile terminal analyzes the information in the current page. If the analyzed information contains the username (or user account) and password information; the username (or user account), password, and a verification code; or the username (or user account), password, and login control information, it is determined that the current page is a login page.

Step 203, determining whether the user logs in for the first time. When the user does not log in for the first time, Step 204 is further executed; otherwise, Step 205 is further executed.

Determining whether the current login is the user's first login can be done by querying the pre-stored login authentication information in a pre-set folder used for storing the login authentication information. If the folder contains the login authentication information, it can be determined that the user is not logging in for the first time.

Step 204, querying the user whether to use the pre-stored login authentication information. If the user selects 'Yes', then Step 206 is further executed; otherwise, Step 205 is further executed.

Step 205, obtaining the login authentication information manually entered by the user. Afterwards, Step 207 is further executed. For example, according to the displayed login page and in the corresponding username and password fields, the user enters the appropriate username and password information through the keyboard on the mobile terminal.

Step 206, loading the pre-stored login authentication information into the current login page. The user can also modify the login authentication information that is loaded into the login page.

Step 207, encapsulating the login authentication information in the current login page and generating a login request. Specifically, after the user confirms the login authentication information, the user clicks the login control in current login page. The mobile terminal browser encapsulates the login authentication information in the current login page into a login request, and sends the request to the Internet website corresponding to the login page for login authentication.

Step 208, determining whether the login authentication information in the login request has been stored. When it is determined that the login authentication information in the login request has not been stored, Step 209 is further executed.

To determine whether the login authentication information in the login request has already been stored, the login authentication information in the current login request is matched with the pre-stored login authentication information. If no match is found, it is determined that the information has not been stored. For example, there are two cases indicating the login authentication information not being stored: one is that the pre-stored login authentication information needs to be overwritten; the other is that the pre-stored login authentication information does not contain the login authentication information. Such matching may be performed similar to Step 102.

Step 209, prompting the user whether to save the login authentication information. If the user chooses to save the login authentication information, Step 210 is further executed. On the other hand, if the user chooses not to save the login authentication information, the process is complete.

Step 210, storing the login authentication information.

By using the disclosed methods for assisting user input based on the mobile terminal browser, the login authentication information entered by the user when a user logs in an Internet website for the first time is stored; the current page in the mobile terminal browser is determined as a login page, and the user logs in again; the pre-stored login authentication information is loaded into the current login page; the login authentication information in the current login page is encapsulated to generate a login request.

Thus, by using the mobile terminal to store the login authentication information for the user login, rather than by using the Internet website to create a Cookie containing the username and password information and issue to the mobile terminal, the login authentication information does not bind to a particular Internet website. The login authentication information stored in the mobile terminal can have more generality, and is suitable for the user to log in to different Internet websites.

In the mean time, if the user uses the same login authentication information at other Internet websites, the pre-stored login authentication information can be used for login authentication, and it may be unnecessary for the user to manually re-enter the login authentication information. Thus, the disclosed methods effectively reduce the number of times that a user is required to manually enter the login authentication information, save the time spent on logging into the Internet website, enable the user to quickly access the services the user is interested in short fragmented time periods, and are able to prevent the risk of the login authentication information being filtered when the information is transmitted between the Internet website and the mobile terminal.

Figure 3:
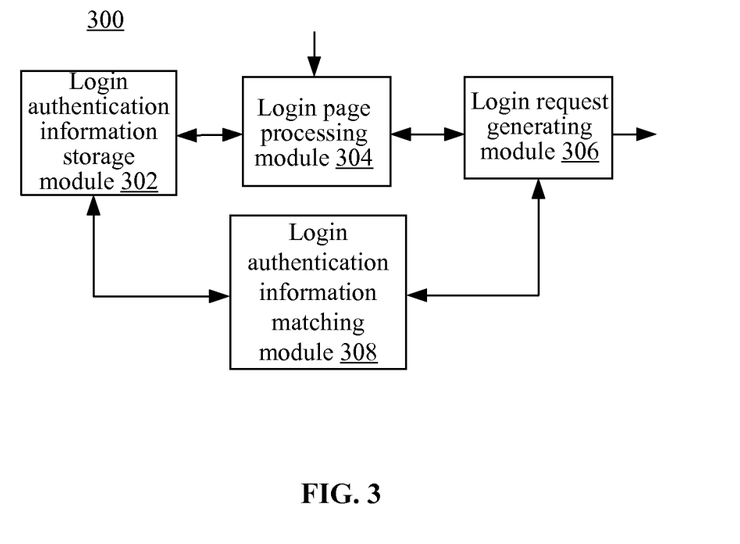
FIG. 3 shows a structure diagram of an exemplary apparatus for assisting user input based on a mobile terminal browser according to the disclosed embodiments.

FIG. 3 is a structure diagram of an apparatus 300 for assisting user input based on a mobile terminal browser. Referring to FIG. 3, the apparatus 300 includes a login authentication information storage module 302, a login page processing module 304, and a login request generating module 306. Other modules may also be included.

The login authentication information storage module 302 is configured to store the login authentication information entered by a user when the user logs in an Internet website for the first time.

The login page processing module 304 is configured to determine that the current page in the mobile terminal browser is a login page and a user logs in again (i.e., second time and beyond), and to load the login authentication information stored in the login authentication information storage module 302 to the current login page.

The login request generation module 306 is configured to receive the login authentication trigger information from the user input, to encapsulate the login authentication information in the current login page, to generate a login request, and to send the login request to the Internet website corresponding to the current login page.

Preferably, after determining a current page in the mobile terminal browser is a login page and a user logs in again, and before loading the login authentication information stored in the login authentication information storage module 302 into the current login page, the login page processing module 304 may be further configured to prompt the user whether the user wants to use the pre-stored login authentication information for the login process. If detecting that the user chooses 'yes', the login page processing module 304 loads the login authentication information stored in the login authentication information storage module 302 into the current login page. Otherwise, the login page processing module 304 receives the login authentication information entered by the user through the keyboard, and loads the entered information into the current login page.

The login page processing module 304 may be further configured to, after loading the login authentication information stored in the login authentication information storage module 302 into the current login page, receive the information entered by the user, and to update the login authentication information loaded into the current login page.

Further, the apparatus 300 may also include a login authentication information matching module 306. The login authentication information matching module 306 may be configured to match the login authentication information in a login request with the login authentication information stored in the login authentication information storage module 302. If the information does not match, the login authentication information matching module 306 updates the login authentication information stored in the login authentication information storage module 302 with the login authentication information in the login request.

The above examples only illustrate certain embodiments of the present invention, and are not intended to limit the present invention. Within the spirit and principles of the present invention, any changes, equivalent substitutions, improvements, etc., should be included in the protection scope of the present invention.

The invention claimed is:

1. A method for assisting user input based on a mobile terminal browser, comprising:
   storing login authentication information entered by a user when the user logs in a first website for a first time from a mobile terminal;
   analyzing page information in a current page in the mobile terminal browser and determining that the current page in the mobile terminal browser is a login page; and
   after determining that the user logged in the first website for the first time and the current page is a login page, loading the stored authentication login information to the current login page, the current login page being a webpage from a second website different from the first website;
   receiving the login authentication trigger information;
   encapsulating the loaded login authentication information of the current login page; and
   generating a login request for login authentication by a website corresponding to the current login page;
   wherein loading the stored authentication login information to the current login page further includes:
      when the user modifies the login authentication information on the first website, updating the login authentication information according to an input from the user;
      storing the updated login authentication information; and
      loading the updated login authentication information into the current login page.

2. The method according to claim 1, wherein analyzing page information in a current page in the mobile terminal browser and determining that the current page in the mobile terminal browser is a login page further includes:
   collecting login page information from one or more websites accessed by the user;
   statistically analyzing the login page information of the websites, the login page information being information about authentication areas of login pages and sub-regions of the authentication areas;
   extracting a plurality of common statistical characteristics information of login pages from the websites;
   storing the common statistical characteristics information;
   analyzing page information in a current page to determine whether the analyzed information contains some of the common statistical characteristics information; and
   when the analyzed information contains some of the common statistical characteristics information, determining that the current page is a login page.

3. The method according to claim 2, wherein the common statistical characteristics information includes:
   username information, user account information, password information, validation code information, and login control information.

4. The method according to claim 1, wherein determining that the user logged in for the first time includes:
   querying history records stored in the mobile terminal; and
   when the history records contain the login authentication information of a website, determining that the user logged in for the first time.

5. The method according to claim 1, wherein determining that the user logged in for the first time includes:
   querying a pre-allocated file used for storing login authentication information;
   when the pre-allocated file contains the login authentication information, determining that the user logs in after the first time.

6. The method according to claim 1, wherein the login authentication information includes the username and password information, or the user account and password information.

7. The method according to claim 1, further including:
   prompting the user whether the user want to use the stored login authentication information for login authentication;
   when the user selects to use the stored login authentication information, loading the stored login authentication information into the current login page; and
   when the user selects not to use the stored login authentication information, receiving login authentication information entered by the user through a keyboard, and loading the entered login information into the current login page.

8. The method according to claim 7, further including:
   matching the login authentication information in the login request against the stored login authentication information;
   when no match found, storing or updating the login authentication information in the login request.

9. The method according to claim 1, wherein, when the stored login authentication information includes two or more records, loading the stored login authentication information into the current login page includes:
   displaying two or more records of the login authentication information in parallel, loading login authentication information selected by the user into the current login page.

10. An apparatus for assisting user input based on a mobile terminal browser, comprising:
a login authentication information storage module;
a login page processing module; and
a login request generation module,
wherein:
the login authentication information storage module is configured to store login authentication information entered by a user when the user logs in a first website for a first time from a mobile terminal;
the login page processing module is configured to analyze page information in a current page in the mobile terminal browser and determine that the current page in the mobile terminal browser is a login page; and after determining that the user logged in the first website for the first time and the current page is a login page, to load the authentication login information stored in the login authentication information storage module into the current login page, the current login page being a webpage from a second website different from the first website; and
the login request generation module is configured to receive login authentication trigger information from user input, to encapsulate the loaded login authentication information of the current login page, to generate a login request, and to send the login request to a website corresponding to the current login page;
wherein loading the authentication login information stored in the login authentication information storage module into the current login page further includes:

when the user modifies the login authentication information on the first website, updating the login authentication information according to an input from the user;
storing the updated login authentication information; and
loading the updated login authentication information into the current login page.

11. The apparatus according to claim 10, wherein the login page processing module is further configured to:
prompt the user whether the user want to use the stored login authentication information for login authentication;
when the user selects to use the stored login authentication information, load the stored login authentication information into the current login page; and
when the user selects not to use the stored login authentication information, receive login authentication information entered by the user through a keyboard, and to load the entered login information into the current login page.

12. The apparatus according to claim 11, further including:
a login authentication information matching module configured to match the login authentication information in the login request against the login authentication information stored in the login authentication information storage module and, when no match found, to update the login authentication information in the login request.

* * * * *